(12) United States Patent
Gong et al.

(10) Patent No.: US 7,406,678 B2
(45) Date of Patent: Jul. 29, 2008

(54) MANAGER COMPONENT RESOURCE ADDITION AND/OR RESOURCE REMOVAL ON BEHALF OF DISTRIBUTED SOFTWARE APPLICATION

(75) Inventors: Weilin Gong, Bartlett, IL (US); Oscar J. Gonzalez, Bridgewater, NJ (US); Li Kuang, Lisle, IL (US); Tim T. Liim, Holmdel, NJ (US); Sunil K. Mishra, Aurora, IL (US); Pravish Prabhakar, Lisle, IL (US); Yansong J. Ren, Aberdeen, NJ (US); Muhammad A. Siddiqui, Monmouth Junction, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 778 days.

(21) Appl. No.: 10/868,144

(22) Filed: Jun. 14, 2004

(65) Prior Publication Data

US 2005/0278689 A1    Dec. 15, 2005

(51) Int. Cl.
*G06F 9/44* (2006.01)

(52) U.S. Cl. .................. 717/121; 717/101; 717/106; 717/107; 717/108; 717/120; 717/122

(58) Field of Classification Search .............. None
See application file for complete search history.

(56) References Cited

U.S. PATENT DOCUMENTS

| 5,634,072 | A  | * | 5/1997 | Allen et al. ............... 718/104 |
| 6,178,529 | B1 | * | 1/2001 | Short et al. ................ 714/51 |
| 2002/0087665 | A1 | * | 7/2002 | Marshall et al. ........... 709/220 |
| 2003/0004952 | A1 | * | 1/2003 | Nixon et al. ............... 707/10 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner*—Chuck O Kendall

(57) ABSTRACT

A distributed software application comprises a plurality of software components within a plurality of executables. A manager component for the distributed software application handles: an addition of one or more first resources to the distributed software application on behalf of the distributed software application and/or a removal of one or more second resources from the distributed software application on behalf of the distributed software application.

20 Claims, 1 Drawing Sheet

MANAGER COMPONENT RESOURCE ADDITION AND/OR RESOURCE REMOVAL ON BEHALF OF DISTRIBUTED SOFTWARE APPLICATION

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., co-filed herewith;

"SOFTWARE COMPONENT INITIALIZATION IN AN ORDERED SEQUENCE," by Buskens, et al., co-filed herewith;

"SHUTTING DOWN A PLURALITY OF SOFTWARE COMPONENTS IN AN ORDERED SEQUENCE," by Buskens, et al., co-filed herewith;

"DISTRIBUTED SOFTWARE APPLICATION SOFTWARE COMPONENT RECOVERY IN AN ORDERED SEQUENCE," by Buskens, et al., co-filed herewith;

"MANAGER COMPONENT FOR CHECKPOINT PROCEDURES," by Buskens, et al., co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. As the workload of the distributed software application change over time, the software components perform a startup and/or a shutdown one or more of the executables. For example, the software components add an executable to cope with an increased workload.

An executable in one example contains a first software component and a second software component that perform separate portions of the functionality of the distributed software application. When an increased workload requires only the first software component and not the second software component, a startup of the executable causes an inefficient allocation of resources for the distributed software application.

As one shortcoming, a software developer must create extra software within the first and second software components to perform the startup and/or shutdown of the executables. As another shortcoming, the startup of the executables for an increased workload may cause an inefficient allocation of resources.

Thus, a need exists to promote an increase in resource allocation efficiency for increased workload of distributed software applications.

SUMMARY

In one embodiment, there is provided an apparatus comprising a manager component for a distributed software application that handles: an addition of one or more first resources to the distributed software application on behalf of the distributed software application and/or a removal of one or more second resources from the distributed software application on behalf of the distributed software application.

In another embodiment, there is provided a method for receiving a first message that comprises an indication to cause an addition of one or more first resources to an external distributed software application on behalf of the external distributed software application and/or a removal of one or more second resources of an external distributed software application on behalf of the external distributed software application; performing a validation of the first message; performing the addition of the one or more first resources and/or the removal of the one or more second resources on behalf of the distributed software application; and updating a configuration file that comprises architecture information about the distributed software application by adding one or more first entries to the configuration file that correspond to the one or more first resources and/or removing one or second entries from the configuration file that correspond to the one or more second resources.

In yet another embodiment, there is provided an apparatus comprising a reusable management infrastructure for a distributed software application. The distributed software application comprises application software of one or more software components within a plurality of executables that run on one or more processors. The reusable management infrastructure comprises a manager component, one or more executable managers, management support software of the one or more software components, and a configuration file. The manager component handles an addition of one or more first resources to the distributed software application on behalf of the distributed software application and/or a removal of one or more second resources from the distributed software application on behalf of the distributed software application. The one or more first resources and/or the one or more second resources comprise one or more of the one or more software components, the plurality of executables, and/or the one or more processors. The manager component employs one or more of the one or more software components as a proxy for creation of one or more resources that comprise software components. The one or more executable managers handle one or more of startup, shutdown, and/or monitor procedures of the plurality of executables. The management support software and the application software of the one or more software components are communicatively coupled by an application programming interface generated by a code generator of the reusable management infrastructure. The configuration file comprises information for startup, initialization, maintenance, and/or shutdown of the distributed software application. The manager component updates the configuration file upon the addition of the one or more first resources and/or the removal of the one or more second resources.

DESCRIPTION OF THE DRAWINGS

Features of exemplary implementations of the invention will become apparent from the description, the claims, and the accompanying drawings in which:

DETAILED DESCRIPTION

Figure 1:
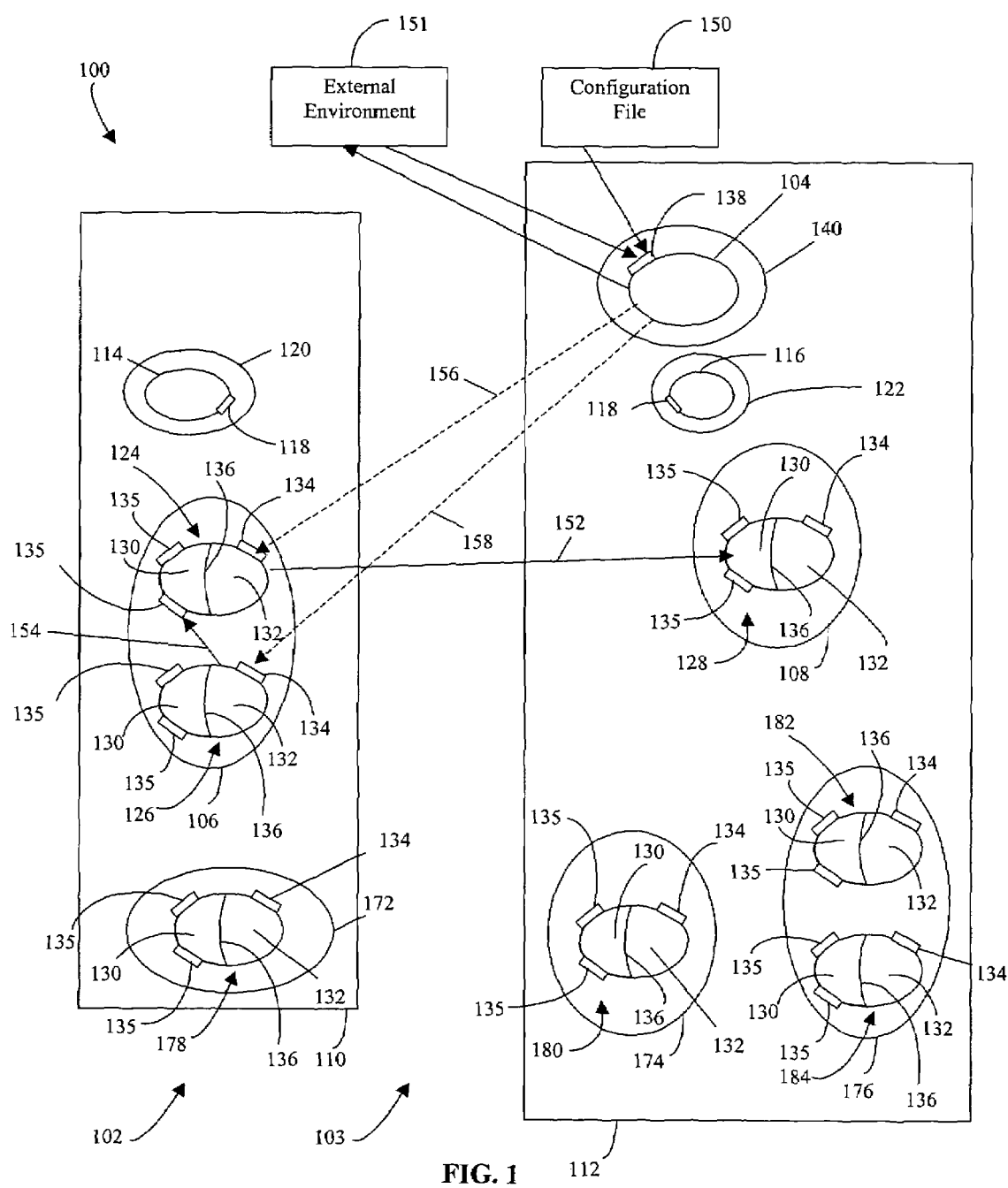
FIG. 1 is a representation of an exemplary implementation of an apparatus that comprises a distributed software application and a management infrastructure.

Turning to FIG. 1, an apparatus 100 in one example comprises a distributed software application 102 and one or more management infrastructures 103. The distributed software application 102 represents a software application divided among a plurality of executables (i.e., software capsules or software entities). For example, the distributed software application 102 comprises a plurality of executables 106, 108, 172, 174 and 176. The distributed software application 102 may run on a single central processing unit ("CPU") or may be divided between multiple CPUs. For example, the executable 106 may run on a processor 110 and the executable 108 may run on a processor 112.

The executables 106, 108, 172, 174 and 176 comprise one or more software components 124, 126, 128, 178, 180, 182 and 184 of the distributed software application 102, as described herein. For example, the executable 106 encapsulates the software components 124 and 126 and the executable 108 encapsulates the software component 128. Within each of the executables 106, 108, 172, 174 and 176 may be tens, hundreds, or even thousands of other software components (e.g., analogous to the software components 124, 126, 128, 178, 180, 182 and 184).

The distributed software application 102 comprises a plurality of software components, for example, the software components 124, 126, 128, 178, 180, 182 and 184. The software components 124, 126, 128, 178, 180, 182 and 184 represent software sub-entities of the executables 106, 108, 172, 174 and 176. For example, the software components 124, 126, 128, 178, 180, 182 and 184 represent logical software blocks and/or software objects. The software components 124 and 126 in one example are developed independently and then put together within the executable 106. For example, the software components 124 and 126 are compiled into the executable 106. The distributed software application 102 may provide any functionality for a computer system. The distributed software application 102 in one example comprises a call processing software application. For example, the distributed software application 102 sets up and/or tears down telecommunication sessions in a telecommunication network.

The management infrastructure 103 performs one or more management procedures for the distributed software application 102. For example, the management infrastructure 103 provides a reusable software framework for one or more management procedures. For example, the management infrastructure 103 handles one or more of starting, stopping, initializing, and monitoring the distributed software application 102, detecting failures of the distributed software application 102, recovering the distributed software application 102, propagating state changes about the distributed software application 102, establishing communication channels between the software components 124, 126, 128, 178, 180, 182 and 184, and the like.

The management infrastructure 103 in one example comprises one or more manager components 104, one or more executable managers 114 and 116 and/or one or more management support components 132. The management infrastructure 103 may run on one or more of the processors 110, 112, and/or a remote processor (not shown). The manager component 104 in one example handles startup, shutdown, initialization, failure detection, recovery, and other functions for the distributed software application 102, as will be appreciated by those skilled in the art.

One or more of the components of the management infrastructure 103, for example, the manager component 104, the executable managers 114 and 116, and the management support software 132 of the software components 124, 126, 128, 178, 180, 182 and/or 184, in one example detect one or more failures and/or faults of the distributed software application 102 and/or the management infrastructure 103. In one example, the software component 124 of the distributed software application 102 returns a response to the manager component 104 during initialization that indicates an error. In another example, the manager component 104 employs a timer to determine a timeout for a message response. For example, the manager component 104 determines an error has occurred if it has not received a message response from the software component 124 within a pre-determined time interval, for example, thirty seconds. The components of the management infrastructure 103 in one example communicate through employment of a fault-tolerant and/or redundant messaging protocol. For example, the fault-tolerant messaging protocol comprises handshake procedures, delivery confirmations, message timeouts, fault detection procedures, and fault escalation procedures, as will be appreciated by those skilled in the art.

The manager component 104 comprises a communication interface 138 for receiving incoming communications. The communication interface 138 is employable for receiving a configuration file 150 for the distributed software application 102. The manager component 104 may employ other means to receive the configuration file 150, such as reading the configuration file 150 directly from a disk or file system. The manager component 104 may also use the communication interface 138 for receipt of external system information from an external environment 151. The external environment 151 in one example represents other components of the system that are in communication with the manager component 104. The communication interface 138 may also receive communications from the executable managers 114 and 116, as well as communications from the software components 124, 126, 128, 178, 180, 182 and 184. The manager component 104 is encapsulated with zero or more other software components in an executable 140. The executable 140 that contains the manager component 104 may be run on either of the processors 110 and 112.

The manager component 104 in one example establishes one or more communication channels between the software components 124, 126, 128, 178, 180, 182 and 184. In one example, the manager component 104 establishes a communication channel 152 between the software component 124 and the software component 128. In another example, the manager component 104 establishes a communication channel 154 between the software component 126 and the software component 124. The manager component 104 sends one or more messages, for example, the messages 156 and 158, to the management support software 130 of the software components 124 and 126, respectively, to establish the communication channels 152 and 154.

The executable managers 114 and 116 comprise a communication interface 118 for communication with the manager component 104. The executable managers 114 and 116 in one example receive instruction from the manager component 104. For example, the executable managers 114 and 116 may receive instructions at the communication interface 118 from the manager component 104. The executable managers 114 and 116 in one example are encapsulated in an executable 120 and an executable 122, respectively.

The executable managers 114 and 116 monitor executables and/or software components of the distributed software application 102 that run on the processors 110 and 112, such as the executables 106, 108, 172, 174 and 176 and the software components 124, 126, 128, 178, 180, 182 and/or 184. For example, the executable managers 114 and 116 monitor communication channels and/or diagnostics on behalf of the executables 106, 108, 172, 174 and 176, and the software components 124, 126, 128, 178, 180, 182 and 184. Should one or more of the executables 106, 108, 172, 174 and 176 and/or the software components 124, 126, 128, 178, 180, 182 and 184 fail, the respective executable manager informs the manager component 104 of the failure.

In one example, the management infrastructure 103 comprises one executable manager per processor. For example, the executable 120 of the executable manager 114 runs on the processor 110. The executable manager 114 monitors the executables 106 and 172 and the software components 124, 126 and 178. The executable 122 of the executable manager 116 runs on the processor 112. The executable manager 116 monitors the executables 108, 174 and 176 and the software components 128, 180, 182 and 184.

Each of the software components 124, 126, 128, 178, 180, 182 and 184 comprise application software 130, management support software 132, a management support software communication interface 134, and one or more application software communication interfaces 135. The software components 124, 126, 128, 178, 180, 182 and 184 employ the management support software communication interface 134 to receive communications from the manager component 104. The software components 124, 126, 128, 178, 180, 182 and 184 employ the application software communication interfaces 135 to receive communications from other software components of the software components 124, 126, 128, 178, 180, 182 and 184. An application programming interface ("API") 136 communicatively couples the application software 130 with the management support software 132 in each of the software components 124, 126, 128, 178, 180, 182 and 184. The application software 130 and the management support software 132 can exchange information through the application programming interface 136. The manager component 104 in one example generates the application programming interface 136 through employment of a code generator.

The software components 124, 126, 128, 178, 180, 182 and 184 each perform some portion of the overall functionality of the distributed software application 102. The software components 124, 126, 128, 178, 180, 182 and 184 work together to make the distributed software application 102 achieve the desired operation. For example, the software components 124, 126, 128, 178, 180, 182 and 184 process incoming requests from each other and perform operations to provide the overall functionality.

An application developer creates the application software 130 of the software components 124, 126, 128, 178, 180, 182 and 184 to perform the designated functionality of the software components 124, 126, 128, 178, 180, 182 and 184. For example, the application developer creates the application software 130 of the software components 124, 126, 128, 178, 180, 182 and 184 to achieve the overall functionality of the distributed software application 102. The management support software 132 of the software components 124, 126, 128, 178, 180, 182 and 184 communicatively couples the software components 124, 126, 128, 178, 180, 182 and 184 to allow the application software 130 to perform the functionality of the distributed software application 102.

To alleviate the application developers from being required to write software into each of the software components 124, 126, 128, 178, 180, 182 and 184 for the management procedures, the manager component 104, the executable managers 114 and 116, and the management support software 132 cooperate to perform the management procedures for the software components 124, 126, 128, 178, 180, 182 and 184. A code generator of the management infrastructure 103 in one example automatically generates the management support software 132. The code generator of the management infrastructure 103 employs the configuration file 150 to create the management support software 132. For example, the configuration file 150 comprises connection information and/or architecture information of the distributed software application 102. The code generator creates code for the management support software 132. The code for the management support software 132 is compiled and linked with the application software 130 in the software components 124, 126, 128, 178, 180, 182 and 184. The management support software 132 may be different for each of the software components 124, 126, 128, 178, 180, 182 and 184, as will be appreciated by those skilled in the art.

One or more of the manager component 104, the executable managers 114 and 116, and/or the software components 124, 126, 128, 178, 182, 184 and 180 in one example comprise a portion of an active/standby group. Each active/standby group comprises a first component (i.e. active component) and a second component (i.e. standby component). The first component performs a portion of the overall functionality of the distributed software application 102 or the management infrastructure 103 while the second components remain inactive. Upon a failure of the first component, the second component is promoted to an active status. For example, the standby component becomes an active component and begins to perform the portion of the overall functionality. The standby component provides a redundancy in operation of the distributed software application 102 and/or the management infrastructure 103. The active/standby group promotes a reduction in downtime for the distributed software application 102 and/or the management infrastructure 103, as will be appreciated by those skilled in the art.

Referring to FIG. 1, an illustrative description of exemplary operation of the apparatus 100 is presented, for explanatory purposes. When a workload of the distributed software application 102 increases, the manager component 104 in one example handles an addition of one or more resources to the distributed software application 102. For example, the manager component 104 initiates a growth procedure while the distributed software application 102 is active. Exemplary resources comprise instances of the software components 124, 126, 128, 178, 180, 182 and/or 184, instances of the executables 106, 108, 172, 174 and/or 176, and/or additional processors 110 and 112. The manager component 104 handles the addition of the resources on behalf of the distributed software application 102, for example, on behalf of the application components 130, as will be appreciated by those skilled in the art. The manager component 104 receives a first message that comprises an indication to add the resources to the distributed software application 102. For example, the manager component 104 receives the first message from the external environment 151. The manager component 104 performs a validation of the message, for example, to ensure that it follows a pre-determined message format.

In one example, the resources comprise a new instance of the software component 182, for example, the software component 184. The manager component 104 maintains a set of internal data structures that correspond to each instance of the software components 124, 126, 128, 178, 180, 182 and 184 of the distributed software application 102. Upon an addition of the software component 184, the manager component 104 creates a new internal data structure that corresponds to the software component 184. The manager component 104 sends a second message to the software component 182 to cause creation of the software component 184 inside executable 176. The software component 182 acts as a proxy of the manager component 104 inside the executable 176. The second message in one example comprises information related to creation of the new instance, for example, a name, class, ID, creation parameters, and/or communication channel information. The software component 182 employs the second message to create the software component 184. Upon completion of the creation, the software component 182 sends a third message to the manager component 104 to confirm the completion. The manager component 104 cooperates with the management support software 132 of the software component 184 to initialize the new instance of the software component 184, as described in SOFTWARE COMPONENT INITIALIZATION IN AN ORDERED SEQUENCE.

In another example, the resources comprise a new instance of the executable 174. The manager component 104 in one example makes a determination of which processor to start the executable on, for example, the processor 112. The manager component 104 sends a second message to the executable manager 116 of the processor 112. The executable manager 116 performs a startup of the new instance of the executable 174 on the processor 112. Upon startup of the new instance of the executable 174, the executable manager 116 sends a third message to the manager component 104 to confirm the startup. The manager component 104 performs an initialization of the software components of the new instance of the executable 174, as described in SOFTWARE COMPONENT INITIALIZATION IN AN ORDERED SEQUENCE.

In yet another example, the resources comprise a new instance of the processor 112. The manager component 104 sends a message to the new instance of the processor 112 to cause a startup of a new instance of the executable manager 116. For example, the manager component 104 sends a message to an operating system of the new instance of the processor 112 to execute the executable 122 on the new instance of the processor 112.

Referring to FIG. 1, upon a reduction in workload of the distributed software application 102, the manager component 104 handles a removal of one or more resources from the distributed software application 102. For example, the manager component 104 initiates a degrowth procedure while the distributed software application 102 is active. The manager component 104 handles the removal of the resources on behalf of the distributed software application 102, for example, on behalf of the application components 130, as will be appreciated by those skilled in the art. The manager component 104 receives a first message that comprises an indication to remove one or more resources from the distributed software application 102. For example, the manager component 104 receives the first message from the external environment 151. The manager component 104 performs a validation of the message, for example, to ensure that it follows a pre-determined message format.

In one example, the resources comprise an unneeded instance of a software component, for example, the software component 124. The manager component 104 sends one or more second messages to one or more second software components of the distributed software application 102 to cause an invalidation of the unneeded software component. The second software components in one example comprise a dependency relationship with the unneeded instance of the software component. For example, the software component 126 comprises a communication channel 154 with the software component 124. The manager component 104 sends a message to the software component 126 to invalidate the communication channel 154 upon receipt of the second message.

The manager component 104 in one example sends one or more third messages to the software component 124. The software component 124 stops processing incoming requests and/or operations, finishes all current requests and/or operations, and performs a shutdown, as described in SHUTTING DOWN A PLURALITY OF SOFTWARE COMPONENTS IN AN ORDERED SEQUENCE. Upon the shutdown of the software component 124, the manager component 104 releases the internal data structure that corresponds to the software component 124. The manager component 104 sends a fourth message to the executable manager 114 to cause the executable manager 114 to stop a monitor procedure of the software component 124.

In another example, the resources comprise an unneeded executable, for example, the executable 108. The manager component 104 performs a shutdown of the software components within the executable 108, for example, the software component 128. In one example, the manager component 104 performs a shutdown of one or more additional software components based on one or more dependency relationships with the software component 128, as described in SHUTTING DOWN A PLURALITY OF SOFTWARE COMPONENTS IN AN ORDERED SEQUENCE. Upon shutdown of the software component 128 and the additional software components, the manager component 104 sends a second message to the executable manager 116 of the executable 108. The executable manager 116 performs a shutdown of the executable 108 and returns a confirmation message to the manager component 104.

In yet another example, the resources comprise a processor. For example, the processor 112 in one example must be shut down for maintenance. The manager component 104 makes a determination of software components and executables that run on the processor 112, for example, the software component 128 and the executable 108. The manager component 104 performs a shutdown of the software components that run on the processor 112, for example, the software component 128. In one example, the manager component 104 performs a shutdown of the software components on the processor 112 in an ordered sequence based on one or more dependency relationships, as described in SHUTTING DOWN A PLURALITY OF SOFTWARE COMPONENTS IN AN ORDERED SEQUENCE. The manager component 104 in one example sends a second message to the executable manager 116 of the processor 112 to cause a shutdown of the executable 108. The manager component 104 in one example sends a third message to the executable manager 116 to cause a shutdown of the executable manager 116. In another example, the manager component 104 sends the third message to an operating system of the processor 112 to cause the shutdown of the executable manager 116.

The manager component 104 in one example handles failure during the addition and/or removal of the resources. For example, the manager component 104 handles a failure during the addition of the new instance of the software component 124. If the failure occurs before the manager component receives the third message that confirms creation of the new instance of the software component 124, the manager component 104 releases the internal data structure previously created for the new instance of the software component 124. If the failure occurs after the manager component has received the third message that confirms the creation, the manager component 104 initiates the degrowth procedure for the new instance of the software component 124.

Upon the addition of the resources to the distributed software application 102 and/or the removal of resources from the distributed software application 102, the manager component 104 in one example performs a load balance procedure. In one example, the manager component 104 performs a shutdown of an instance of the software component 124 on the processor 110 and performs a startup of another instance of the software component 124 on the processor 112. In another example, the manager component 104 performs a shutdown of an instance of the executable 108 on the processor 110 and performs a startup of another instance of the executable 108 on the processor 112, as will be appreciated by those skilled in the art.

The manager component 104 in one example performs a simultaneous addition of one or more first resources and removal of one or more second resources for the distributed software application 102 to perform a handoff between the first and second resources. For example, the manager component 104 performs a startup of a new instance of the software component 124 on the processor 110 to replace a deprecated instance of the software component 124 on the processor 110. The manager component 104 performs the startup of the new instance of the software component 124. During initialization of the new instance of the software component 124, the manager component 104 performs a handoff of the functionality of the deprecated instance of the software component 124 to the new instance of the software component 124, for example, to promote a reduction in downtime of the functionality of the software component 124. Upon completion of the initialization of the new instance of the software component 124 and the handoff of the functionality to the new instance of the software component 124, the manager component 104 performs a shutdown of the deprecated instance of the software component 124, as will be appreciated by those skilled in the art.

Upon the addition and/or removal of the resources for the distributed software application 102, the manager component 104 updates the configuration file 150. In one example, upon an addition of the processor 106 to the distributed software application 102, the manager component 104 adds an entry to the configuration file 150, for example, to a list of available processors for the distributed software application 102. In another example, upon a removal of an instance of the software component 126, the manager component 104 removes an entry of the configuration file 150 that corresponds to the instance of the software component 126.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the management infrastructure 103. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a reusable management infrastructure for a distributed software application that is external to the reusable management infrastructure, wherein the distributed software application comprises application software of one or more software components within a plurality of executables that run on one or more processors;
wherein the reusable management infrastructure comprises a manager component, management support software for the one or more software components, and a configuration file;
wherein the reusable management infrastructure employs a code generator and the configuration file to generate the management support software for the application software and to generate an application programming interface for communication between the management support software and the application software;
wherein the manager component is configured to handle:
an addition of one or more first resources to the distributed software application on behalf of the distributed software application; and/or
a removal of one or more second resources from the distributed software application on behalf of the distributed software application.

2. The apparatus of claim 1, wherein the one or more first resources and/or the one or more second resources comprise one or more of the software components;
wherein one software component of the one or more software components comprises a portion of one executable of the plurality of executables of the distributed software application;
wherein the manager component handles:
an addition of one or more of the one or more software components to the distributed software application on behalf of the distributed software application; and/or
a removal of one or more of the one or more software components from the distributed software application on behalf of the distributed software application.

3. The apparatus of claim 2, wherein the manager component employs one of the one or more software components as a proxy to create the one or more software components for the distributed software application.

4. The apparatus of claim 1, further comprising:
one or more executable managers;
wherein the one or more resources comprise one or more executables;
wherein the manager component sends one or more messages to the one or more executable managers;
wherein the one or more executable managers start the one or more executables based on the one or more messages to cause an addition of the one or more executables to the distributed software application.

5. The apparatus of claim 1, further comprising:
one or more executable managers;
wherein the one or more resources comprise one or more processors;
wherein the manager component starts the one or more executable managers on the one or more processors to cause an addition of the one or more processors to the distributed software application.

6. The apparatus of claim 1, further comprising:
a configuration file that comprises architecture information about the distributed software application;
wherein the manager component adds one or more first entries to the configuration file that correspond to the one or more first resources and/or removes one or second entries from the configuration file that correspond to the one or more second resources.

7. A method, comprising the steps of:
receiving a first message that comprises an indication to cause:
an addition of one or more first resources to an external distributed software application on behalf of the external distributed software application; and/or
a removal of one or more second resources of an external distributed software application on behalf of the external distributed software application;
performing a validation of the first message;
performing the addition of the one or more first resources and/or the removal of the one or more second resources on behalf of the distributed software application;
updating a configuration file that comprises architecture information about the distributed software application by:
adding one or more first entries to the configuration file that correspond to the one or more first resources; and/or
removing one or more second entries from the configuration file that correspond to the one or more second resources;
generating management support software for application software of the external distributed software application through employment of the configuration file and a code generator;
generating an application programming interface for communication between the management support software and the application software through employment of the configuration file and the code generator.

8. The method of claim 7, wherein the one or more first resources comprise a software component of the external distributed software application, wherein the step of performing the addition of the one or more first resources and/or the removal of the one or more second resources on behalf of the distributed software application comprises the steps of:
creating one or more internal data structures that correspond to the software component;
sending a second message to a proxy component, that comprises a template for the software component, to cause a creation of the software component;
receiving a third message from the proxy component that comprises confirmation of the creation of the software component;
performing an initialization of the software component.

9. The method of claim 8, further comprising the steps of:
releasing the one or more internal data structures that correspond to the software component upon a failure during the addition of the software component.

10. The method of claim 7, wherein the one or more second resources comprise a first software component of the external distributed software application, wherein the step of performing the addition of the one or more first resources and/or the removal of the one or more second resources on behalf of the distributed software application comprises the steps of:
sending one or more second messages to one or more second software components of the distributed software application to cause an invalidation of the first software component;
sending one or more third messages to the software component to cause the software component to stop receiving incoming requests, to finish any current requests, and to perform a shutdown;
releasing one or more internal data structures that correspond to the first software component;
sending a fourth message to an executable manager of the first software component to cause the executable manager to stop a monitor procedure of the first software component.

11. The method of claim 7, wherein the one or more first resources comprise an executable of the distributed software application, wherein the step of performing the addition of the one or more first resources and/or the removal of the one or more second resources on behalf of the distributed software application comprises the steps of:
sending a second message to an executable manager to cause a startup of the executable;
performing an initialization of one or more software components of the executable in an ordered sequence based on one or more dependency relationships between the one or more software components.

12. The method of claim 7, wherein the one or more second resources comprise an executable of the distributed software application, wherein the step of performing the addition of the one or more first resources and/or the removal of the one or more second resources on behalf of the distributed software application comprises the steps of:
performing a shutdown of one or more software components of the executable and/or one or more additional software components that comprise one or more dependency relationship with the one or more software components in an ordered sequence based on the one or more dependency relationships;

sending a second message to an executable manager of the executable to cause a shutdown of the executable.

13. The method of claim 7, wherein the one or more first resources comprise a processor for execution of one or more portions of the distributed software application, wherein the step of performing the addition of the one or more first resources and/or the removal of the one or more second resources on behalf of the distributed software application comprises the step of:

causing a startup of an executable manager on the processor.

14. The method of claim 7, wherein the one or more second resources comprise a processor for execution of one or more portions of the distributed software application, wherein the step of performing the addition of the one or more first resources and/or the removal of the one or more second resources on behalf of the distributed software application comprises the steps of:

performing a shutdown of one or more software components, of one or more executables that run on the processor, in an ordered sequence based on one or more dependency relationships between the one or more software components;

sending a second message to an executable manager of the one or more executables to cause the executable manager to perform a shutdown of the one or more executables;

sending a third message to the executable manager to cause a shutdown of the executable manager.

15. The method of claim 7, further comprising the step of:

performing a load balance of one or more software components and/or one or more executables of the distributed software application across one or more processors for the distributed software application based on the addition of the one or more first resources and/or the removal of the one or more second resources.

16. The method of claim 7, wherein the one or more second resources perform a portion of functionality of the distributed software application, wherein the one or more first resources correspond to the one or more second resources, the method further comprising the step of:

performing a handoff of the portion of functionality of the distributed software application from the one or more second resources to the one or more first resources.

17. An apparatus, comprising:

a reusable management infrastructure for a distributed software application that is external to the reusable management infrastructure, wherein the distributed software application comprises application software of one or more software components within a plurality of executables that run on one or more processors;

wherein the reusable management infrastructure comprises a manager component, one or more executable managers, management support software of the one or more software components, and a configuration file;

wherein the manager component handles an addition of one or more first resources to the distributed software application on behalf of the distributed software application and/or a removal of one or more second resources from the distributed software application on behalf of the distributed software application;

wherein the one or more first resources and/or the one or more second resources comprise one or more of the one or more software components, the plurality of executables, and/or the one or more processors;

wherein the manager component employs one or more of the one or more software components as a proxy for creation of one or more resources that comprise software components;

wherein the one or more executable managers handle one or more of startup, shutdown, and/or monitor procedures of the plurality of executables;

wherein the management support software and the application software of the one or more software components are communicatively coupled by an application programming interface generated by a code generator of the reusable management infrastructure;

wherein the reusable management infrastructure employs the code generator and the configuration file to generate the management support software for the one or more software components;

wherein the configuration file comprises information for startup, initialization, maintenance, and/or shutdown of the distributed software application;

wherein the manager component updates the configuration file upon the addition of the one or more first resources and/or the removal of the one or more second resources.

18. The apparatus of claim 17, wherein the one or more first resources comprise a first software component, wherein the one or more second resources comprise a second software component;

wherein the manager component comprises one or more internal data structures that correspond to the one or more software components of the distributed software application;

wherein the manager component creates a first internal data structure that corresponds to the first software component and adds the first internal data structure to the one or more internal data structures upon the addition of the first software component to the distributed software application;

wherein the manager component removes a second internal data structure from the one or more internal data structures that corresponds to the second software component upon the removal of the second software component from the distributed software application.

19. The apparatus of claim 17, wherein the one or more first resources comprise a first executable, wherein the one or more second resources comprise a second executable;

wherein the manager component cooperates with a first executable manager of the one or more executable managers to cause a startup of the first executable upon an addition of the first executable to the distributed software application;

wherein the manager component cooperates with a second executable manager of the one or more executable managers to cause a shutdown of the second executable upon a removal of the second executable from the distributed software application.

20. The apparatus of claim 17, wherein the one or more first resources comprise a first processor, wherein the one or more second resources comprise a second processor;

wherein the manager component cases a startup of a new executable manager that runs on the first processor upon an addition of the first processor to the distributed software application;

wherein the manager component causes a shutdown of one executable manager of the one or more executable managers that runs on the second processor upon a removal of the second processor from the distributed software application;

wherein the manager component performs a load balance upon one or more of the addition of the first processor and/or the removal of the second processor.

* * * * *